United States Patent
Cyr et al.

(10) Patent No.: US 8,301,860 B2
(45) Date of Patent: Oct. 30, 2012

(54) IDENTIFYING DYNAMICALLY CHANGING VIRTUAL STORAGE DEVICES

(75) Inventors: Michael P. Cyr, Georgetown, TX (US);
James A. Pafumi, Leander, TX (US);
Jacob J. Rosales, Austin, TX (US);
Morgan J. Rosas, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/580,871

(22) Filed: Oct. 16, 2009

(65) Prior Publication Data

US 2011/0093679 A1   Apr. 21, 2011

(51) Int. Cl.
*G06F 12/00* (2006.01)
(52) U.S. Cl. ............................. 711/170; 711/E12.001
(58) Field of Classification Search ............... 711/170, 711/E12.001
See application file for complete search history.

(56) References Cited

U.S. PATENT DOCUMENTS

| | | | |
|---|---|---|---|
| 6,330,621 B1 | 12/2001 | Bakke et al. | |
| 6,895,485 B1 | 5/2005 | DeKoning et al. | |
| 7,783,831 B1 * | 8/2010 | Dalal et al. | 711/114 |
| 2010/0100881 A1 * | 4/2010 | Shigeta et al. | 718/1 |
| 2010/0115049 A1 * | 5/2010 | Matsunaga et al. | 709/216 |
| 2010/0169880 A1 * | 7/2010 | Haviv et al. | 718/1 |
| 2010/0235592 A1 * | 9/2010 | Kaneda et al. | 711/161 |
| 2011/0010488 A1 * | 1/2011 | Aszmann et al. | 711/103 |
| 2011/0035548 A1 * | 2/2011 | Kimmel et al. | 711/114 |
| 2011/0066872 A1 * | 3/2011 | Miller et al. | 713/340 |
| 2011/0289127 A1 * | 11/2011 | Tam | 707/828 |

* cited by examiner

*Primary Examiner* — Kevin Ellis
*Assistant Examiner* — Mehdi Namazi
(74) *Attorney, Agent, or Firm* — Stephen J. Walder, Jr.; Libby Z. Toub (57) ABSTRACT

Mechanisms are provided for detecting changes in virtual storage device configurations. The mechanisms detect an event corresponding to a change in configuration of a virtual storage device. The virtual storage device is comprised of a plurality of portions of a plurality of physical storage devices. The mechanisms further, in response to detecting the event, determine if the change in configuration of the virtual storage device results in a change in the types of physical storage devices that are part of the virtual storage device. Moreover, the mechanisms further transmit a notification, in response to a determination that the change in configuration of the virtual storage device results in a change in the types of physical storage devices that are part of the virtual storage device, of the results of the change in configuration of the virtual storage device to one or more registered recipients registered to receive such notifications.

23 Claims, 3 Drawing Sheets

IDENTIFYING DYNAMICALLY CHANGING VIRTUAL STORAGE DEVICES

BACKGROUND

The present application relates generally to an improved data processing apparatus and method and more specifically to mechanisms for identifying dynamically changing virtual storage devices.

In many computing environments today, the operating system, a hypervisor, or other mechanism is provided to separate a logical representation of storage devices from the actual physical storage devices so as to provide a virtual representation of the storage devices, i.e. virtual storage devices, to the applications running on the computing devices. The virtual storage device is thus, a logical representation of portions of one or more physical storage devices as if these portions together were a single separate physical storage device from the viewpoint of the applications accessing the virtual storage device.

Typically, virtual storage devices are comprised of portions of a plurality of rotating disk storage devices, i.e. hard disk drives (HDDs) comprised of one or more rotating physical disks upon which data is magnetically encoded and read by an arm and sensor assembly. Recently, Solid State Drives (SSDs) devices have been developed and integrated into computing environments. A SSD is data storage device that uses solid state memory, instead of rotating disks, to store persistent data. An SSD emulates a hard disk drive interface and thus, can easily be used in place of hard disk drives in many environments. SSDs typically have a higher access rate than HDDs and thus, can potentially provide greater input/output (I/O) performance over rotating disks of HDDs.

SUMMARY

In one illustrative embodiment, a method, in a data processing system, is provided for detecting changes in virtual storage device configurations. The method comprises detecting, by a monitoring agent in the data processing system, an event corresponding to a change in configuration of a virtual storage device. The virtual storage device is comprised of a plurality of portions of a plurality of physical storage devices. The method further comprises, in response to detecting the event, determining, by the monitoring agent in the data processing system, if the change in configuration of the virtual storage device results in a change in the types of physical storage devices that are part of the virtual storage device. Moreover, the method comprises, in response to a determination that the change in configuration of the virtual storage device results in a change in the types of physical storage devices that are part of the virtual storage device, transmitting, by the monitoring agent in the data processing system, a notification of the results of the change in configuration of the virtual storage device to one or more registered recipients registered to receive such notifications.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Due to the potential of increased input/output (I/O) performance available from the use of Solid State Drive (SSD) in storage systems, and the increased integration of SSDs into such storage systems, it is becoming more important for client computing devices to identify which virtual storage devices make use of these SSDs so as to take full advantage of the potential gains in I/O performance. The illustrative embodiments provide mechanisms for identifying when the physical configuration of physical storage devices that comprise the physical storage devices of a virtual storage device have changed and notifying registered recipients when such changes have occurred so that appropriate actions can be taken to maximize the performance of computing devices using these virtual storage devices.

Within virtual I/O servers (VIOS), this ability is further important to virtual block storage devices served to virtual clients. As is generally known in the art, virtual servers are a logical collection of computing resources that together operate as a server to one or more physical or virtual client computing devices. Virtual servers may be generated dynamically as conditions require additional server processing resources. Virtual clients, like virtual servers, are a logical combination of computing resources but which act as clients with regard to virtual or physical servers.

It should be appreciated that the use of virtual servers and virtual clients in the present description is only for illustrative purposes only and the mechanisms of the illustrative embodiments may also be applied to physical servers, physical clients, or any combination of physical and virtual servers/clients without departing from the spirit and scope of the illustrative embodiments. Furthermore, the mechanisms of the illustrative embodiments may be implemented in conjunction with any computing device or system that utilizes logical or virtual storage devices that may be comprised of a uniform set of physical storage devices having similar access rates, e.g., rotational rates, or a plurality of different physical storage devices having different access rates or rotational rates.

Using the virtual I/O server computing environment as an example, the virtual storage devices can be composed of hard disk drives (HDDs), Solid State Drives (SSDs), or a hybrid combination of both. These hybrid virtual storage devices do not provide any indication to the virtual clients of the underlying potential of the hybrid virtual storage device. For example, a virtual SCSI disk device can be composed of a HDD physical disk, a HDD logical volume, a HDD file backed device, a SSD physical disk, a SSD logical volume, a SSD file backed device, HDD/SSD logical volume, or a HDD/SSD file backed device.

It is beneficial in such environments to be able to identify when the virtual storage device resides only on SSD devices. Doing so allows the virtual clients to use these devices for applications that require fast data I/O. Identification mismatch between the VIOS and the virtual client can occur if the virtual device changes from an SSD device to a hybrid or vice versa. This can occur when virtual devices backed by logical volumes or files that are composed of only SSD physical disks are modified by adding HDD devices to the logical volume or file backed device. This causes the problem where the virtual client believes it is using only SSD storage when in fact it may be using rotating disk media as well. The illustrative embodiments provide mechanisms whereby the virtual client is informed when a composite virtual storage device is entirely backed by SSD devices and when such a configuration changes to a hybrid configuration.

In one illustrative embodiment, the mechanisms utilize a query command provided by the SCSI Block Command 3 (SBC 3) specification that allows a client computing device to identify the rotation rate of a medium of a block storage device. With this query command, if the block storage device reports a rotation rate of 1, it is assumed that the block storage device is of a non-rotating medium, i.e. a SSD device. The VIOS queries all the underlying physical storage devices to identify if the physical storage devices are SSD devices or not. From this information, it can be determined what the underlying physical configuration of each virtual storage device is and report this information back to the virtual client. If the virtual storage device is backed by a collection of physical SSD and HDD devices, then the virtual storage device is not reported to the virtual client as an SSD virtual storage device but rather an HDD based virtual storage device since the HDD performance is the limiting factor to the I/O performance of the virtual storage device. When the virtual storage device is comprised of only SSD devices, the virtual client is notified of this when it queries for VPD page 0xB1. That is, the SCSI specification defines an Inquiry command where a client device can request one of various vital product data (VPD) pages, one of which is the Block Device Characteristics page, i.e. the VPD page having page code 0xB1. This Inquiry command can be used to identify, via the VPD page 0xB1, that a device has a non-rotating medium, as defined in the SCSI Block Commands 3 (SBC-3) specification.

Virtual storage devices can be "backed" in a number of different ways depending on where the actual data that represents the virtual storage device is stored. The virtual storage devices can be backed by an actual physical disk, a logical volume, or even just a single file, for example. When the virtual storage device is backed by a logical volume or a file, for example, there exists the potential for the underlying physical storage devices to change over time from SSD devices only making up the virtual storage device to a hybrid combination of SSD devices and HDD devices. This is due to the fact that new drives, either rotating disk based devices or solid state devices, can be added to the underlying logical volume group and the logical volume can be striped across these new devices. In order to still correctly inform the virtual clients of the performance of the logical volume, the mechanisms of the illustrative embodiments detect such changes and inform the virtual client of the change such that appropriate modification to the virtual client can be performed to optimize the performance of the virtual client with regard to the virtual storage device, logical volume, etc.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented.

Figure 1:
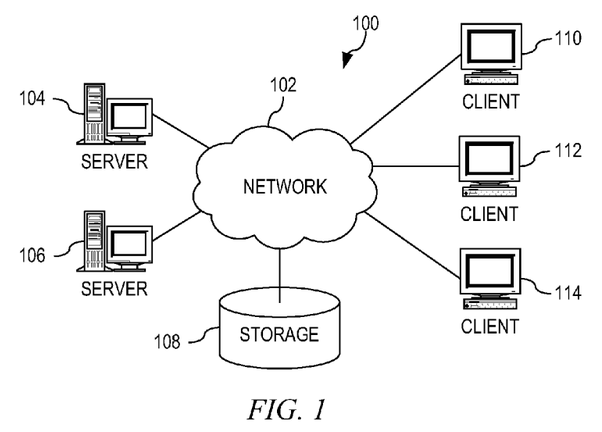
FIG. 1 is an example diagram of a distributed data processing environment in which exemplary aspects of the illustrative embodiments may be implemented.
Figure 2:
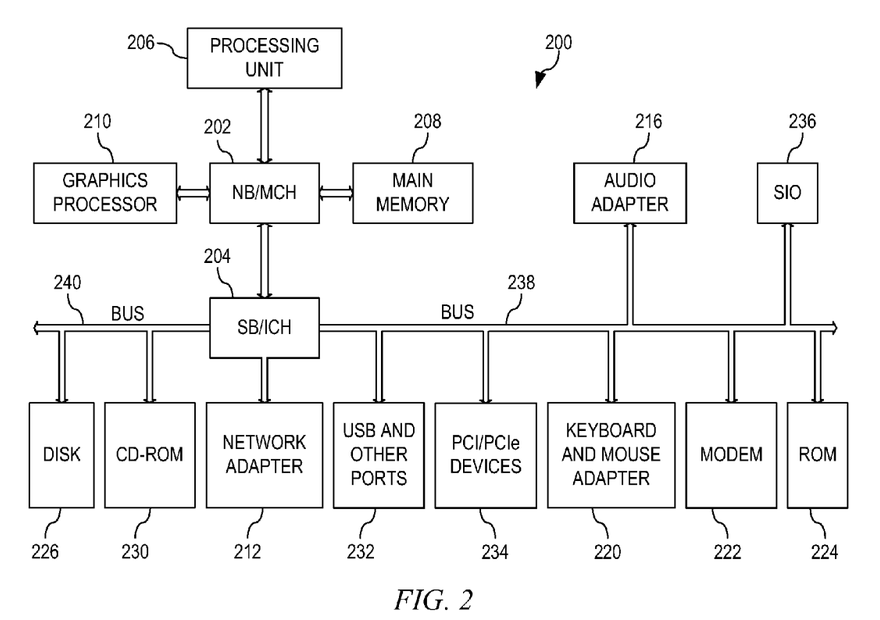
FIG. 2 is an example diagram of a data processing device in which exemplary aspects of the illustrative embodiments may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With reference again to FIG. 1, it is assumed that either a server 104 or 106, or the network attached storage system 108, provides a virtual input/output server (VIOS) through which a physical or virtual client, such as may be provided by client computing device 110, for example, accesses a virtual storage device, logical volume, file backed storage device, or the like. For purposes of the present description, the storage is considered to be a virtual storage device, but any virtual or logical storage that may be comprised of portions of one or more physical storage devices may be utilized without departing from the spirit and scope of the illustrative embodiments. The virtual storage device may be comprised of a plurality of portions of a plurality of physical storage devices either in association with the server 104 or 106, and/or part of the network attached storage system 108.

The virtual server may stripe data of a virtual storage device across portions of the plurality of physical storage devices that comprise the virtual storage device. As such, there may be differing access speeds for the various physical storage devices in the particular virtual storage device. For example, the physical storage devices may include one or more types of storage devices including standard SCSI type hard disk devices, fiber channel storage devices, solid state disk storage devices, and the like. As an example, the concept of tiered storage has recently been promoted for storage systems in which tiers of storage devices are provided with each tier having differing access capabilities such that workloads can be appropriately directed to storage devices based on priorities of the workloads and the storage device capabilities.

The virtual storage device may have its configuration changed over time by the addition of new physical storage devices, the removal of physical storage devices, the migration of data from one set of physical storage devices to another at the same or different physical locations within the network, or the like. Regardless of the particular reason for the change in configuration of the virtual storage device, the change in configuration may result in a change of the composition of the types of physical storage devices that comprise the virtual storage device such that there is a change in the access rates, rotational speeds, and the like, of the physical storage devices in the virtual storage device.

Of particular importance is the situation when a virtual storage device that is comprised of relatively high speed I/O access storage devices, e.g., solid state drive (SSD) devices, is modified to include portions of physical storage devices that have a relatively lower I/O access speed, such as SCSI rotating disk based hard disk drives (HDDs). In such a situation, the virtual storage device becomes a hybrid of I/O access speeds or, if all of the physical storage devices are replaced with lower I/O access speed storage devices, a completely lower speed I/O access speed virtual storage device. However, the physical or virtual clients that are making use of the virtual storage device may be expecting the I/O access speed to remain at the level of the original configuration of this virtual storage device, e.g., the relatively higher I/O access speed of the SSD devices. In such a situation, it is important to inform the VIOS of the change of the configuration of the virtual storage device with regard to I/O access speeds. The VIOS may then inform physical and/or virtual clients of the change in configuration of the virtual storage device so that appropriate actions may be taken to maximize performance of the applications of the physical/virtual clients with regard to I/O access to the virtual storage device.

The monitoring mechanisms that identifies the change in configuration of virtual storage devices may be provided in the VIOS itself, another virtualization intermediary whose duty it is to virtualize I/O operations, such as a hypervisor or the like, in control unit of a the storage system providing the virtual storage devices, or the like. The VIOS and/or the virtual clients may register with the monitoring mechanism, an operating system associated with the monitoring mechanism, or the like, to receive notifications in the event of a change to the configuration of a virtual storage device. Such notifications may be triggered by one or more particular events occurring for which the VIOS and/or virtual clients are registered to receive notifications. When such events occur, the registered recipients of notifications for that event will receive the notifications and thereby be informed of the change in configuration of the virtual storage device such that they may take appropriate action to maximize performance with regard to I/O accessing of data of the virtual storage device. For example, these actions may include one or more actions whereby a virtual client moves workloads to virtual storage devices where the workloads can achieve faster I/O times.

In identifying the change in configuration of the virtual storage devices, the monitoring mechanisms of the illustrative embodiments may determine the I/O access speed of the particular physical storage devices that comprise the virtual storage devices. For example, upon initialization of a virtual storage device, upon addition of a new physical storage device to an existing virtual storage device, upon migration of data from one virtual storage device to another, or any other appropriate event at which time the determination of the I/O access rate of a physical storage device needs to be made, the monitoring mechanisms may determine the I/O access rate of the physical storage devices that comprise a virtual storage device. The determination of the I/O access rate may involve determining the rotational speed of the physical storage device. Such information, in one illustrative embodiment, may be obtained by access vital product data (VPD) made available by a device manufacturer and provided to the monitoring mechanism as a data file. In one illustrative embodiment, the VPD information may be stored in the physical storage device itself and may be reported to the monitoring mechanism upon adding the physical storage device to the data processing environment or may be accessed with an appropriate command.

In another illustrative embodiment, the monitoring mechanisms may utilize a query command provided by the SCSI Block Command 3 (SBC 3) specification that allows a client computing device to identify the rotation rate of a medium of a physical block storage device. With this query command, if the block storage device reports a rotation rate of 1, it is assumed that the block storage device is of a non-rotating medium, i.e. a SSD device. The monitoring mechanisms of the illustrative embodiments, e.g., the VIOS, queries all the underlying physical storage devices to identify if the physical storage devices are SSD devices or not. From this information, it can be determined what the underlying physical configuration of each virtual storage device is and report this information back to the virtual clients or otherwise determine whether a virtual storage device is comprised entirely of non-rotating media devices, e.g., SSD devices, is a hybrid of non-rotating and rotating media devices, or is comprised entirely of rotating media devices. If the virtual storage device is backed by a collection of physical non-rotating media devices (e.g., SSD devices) and rotating media devices (e.g., HDD devices), then the virtual storage device is not reported to the virtual client as a non-rotating media device, e.g., SSD virtual storage device, but rather an HDD based virtual storage device since the HDD performance is the limiting factor to the I/O performance of the virtual storage device.

Figure 3:
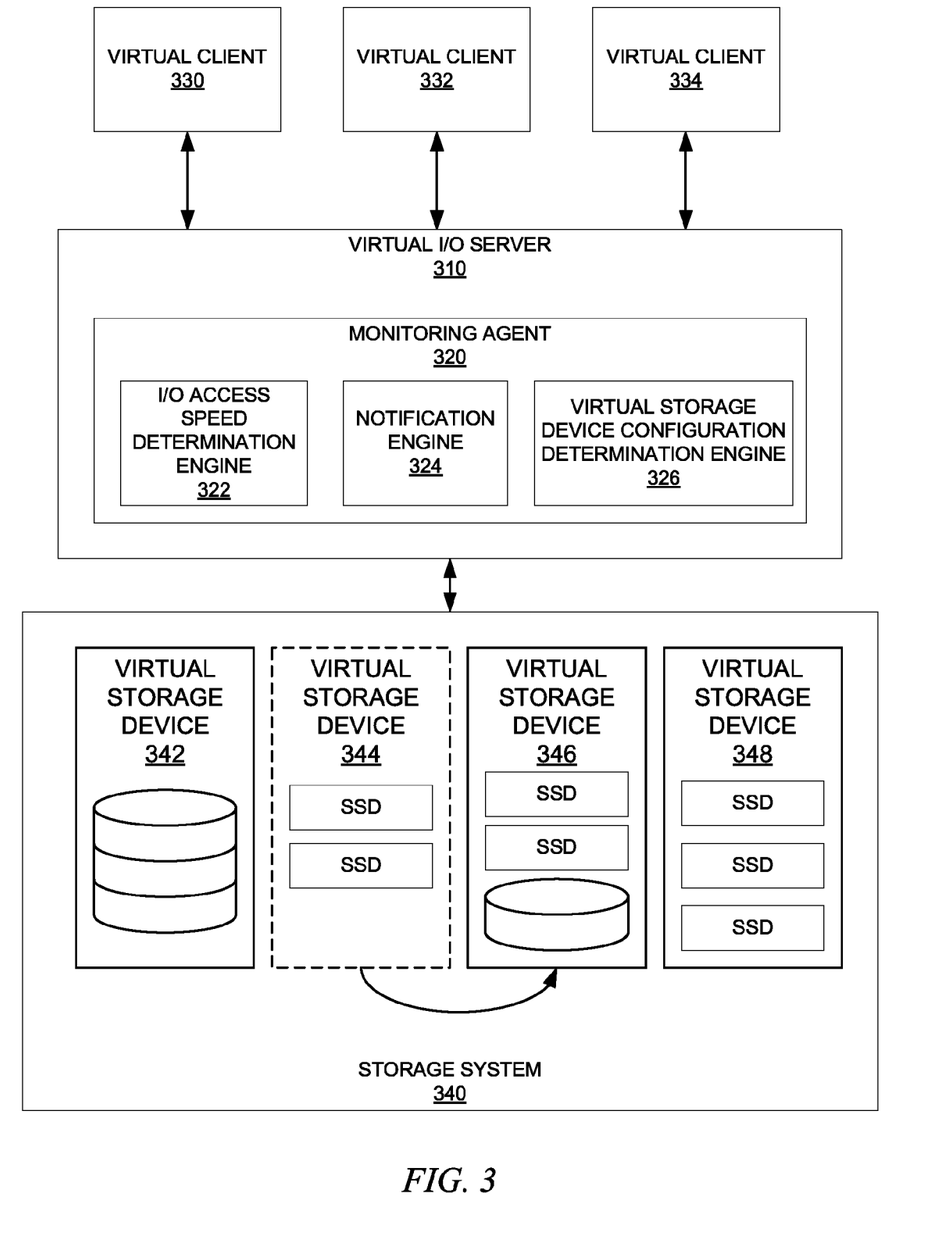
FIG. 3 is an example block diagram of the primary operational components of a virtual storage device configuration modification monitoring engine in accordance with one illustrative embodiment.

For a better understanding of the mechanisms of the illustrative embodiments, reference is now made to FIG. 3 which is an example block diagram of the primary operational components of a virtual storage device configuration modification monitoring engine in accordance with one illustrative embodiment. It should be appreciated that the elements shown in FIG. 3, unless otherwise indicated, may be provided as hardware, software, or any combination of hardware and software. In one illustrative embodiment, unless otherwise indicated, elements of FIG. 3 are implemented as software instructions executing on one or more data processing devices.

As shown in FIG. 3, a virtual input/output server (VIOS) 310 is provided in association with a storage system 340. Virtual clients 330-334 may access data in the virtual storage devices 342-348 of the storage system 340 via the VIOS 310. The VIOS 310 includes a monitoring agent 320 for monitoring the status of the virtual storage devices 342-348 and receiving events indicative of a change in the configuration of the virtual storage devices 342-348.

In one illustrative embodiment, the monitoring agent 320 utilizes a callback framework that allows registered entities to be notified in the event that the underlying physical storage devices that comprise the virtual storage devices, logical volumes, or the like, have changed. Such events may include an initialization of a virtual storage device 342-348, addition or removal of a physical storage device from a virtual storage device 342-348, migration of a virtual storage device 342-348 from one set of physical storage devices to another set of physical storage devices, or the like.

For example, if a VIOS initiated command adds a HDD device to a logical volume or file backed virtual storage device that previously was composed of only SSD devices, then the command may be an event that is detected by the VIOS' monitoring agent 320 such that the updated configuration of the virtual storage device may be determined and appropriate notifications sent to registered recipients via the callback framework. The monitoring agent 320 may be registered with the VIOS 310, or an operating system hosting the VIOS 310, such that an event handler for the VIOS initiated command issues a notification to the monitoring agent 320 when such an event occurs. The registering of recipients for notifications of events is generally known in the art, however, prior to the present invention, such mechanisms had not been previously used to monitor events occurring with regard to the changing of configurations of virtual storage devices.

The callback framework may be used in combination with mechanisms for detecting the I/O access speeds of the physical storage devices, such as the I/O access speed determination engine 322. The I/O access speed determination engine 322 may make use of commands, may query vital product data available from the physical storage devices themselves or otherwise provided as input data to the monitoring agent 320 by an outside source, or any other means of determining the I/O access speed of the physical storage devices that are the subject of the event, e.g., the I/O access speed of the physical storage devices being added to a particular virtual storage device 344. In one illustrative embodiment, the I/O access speed determination engine 322 may utilize the SCSI Block Command 3 query command to determine the I/O access speed, e.g., the rotation rate, of the physical storage devices being added and determine whether the devices being added are SSD devices or HDD devices. Alternatively, rather than using a SCSI Block Command 3 query command, other mechanisms for determining the I/O access speed of the physical storage devices being added may be used without departing from the spirit and scope of the illustrative embodiments. Another alternative may be, for example, using a device description string to attempt to determine if a device is a HDD or SDD device. In an AIX environment, using an Isdev command can provide such a device description string.

It is assumed that the I/O access speeds of the other physical storage devices that were already present in the virtual storage device are known from a previous use of the I/O access speed detection engine 322, such as upon initialization of the virtual storage device 342-348. Such information may be stored in the monitoring agent 320, such as in association with the virtual storage device configuration determination engine 326. This information may be used by the virtual storage device configuration determination engine 326 when determining changes in configuration of virtual storage devices 342-348.

Once the I/O access speed of the physical storage devices that are the subject of the event are known, e.g., the I/O access speed of the physical storage devices being added by way of the VIOS command, the monitoring agent 320 may then determine the types of physical storage devices being added/removed as part of the event and whether the addition/removal of that physical storage device will constitute a change types of storage devices comprising the virtual storage device either by making the virtual storage device 342-348 a combination of a plurality of types of physical storage devices or a combination of a uniform type of physical storage devices. Moreover, the monitoring agent 320 may determine whether the change to the virtual storage device 342-348, logical volume, or the like, that needs to be communicated to virtual clients 330-334.

In one illustrative embodiment, the virtual storage device configuration determination engine 326, based on the I/O access speeds determined by the I/O access speed determination engine 322, determines the type of physical storage devices being added or removed from virtual storage devices 342-348. The types of physical storage devices may be, in one illustrative embodiment, rotating disk media based physical storage devices and non-rotating disk media based physical storage devices. Based on the type of physical storage device being added or removed, and the types of other physical storage devices present in the virtual storage device 342-348, the virtual storage device configuration determination engine 326 may determine whether the I/O performance characteristics of the virtual storage device 342-348 have been improved or reduced by the addition/removal of the physical storage devices and whether the change constitutes a non-uniform type of physical storage devices amongst the physical storage devices comprising the virtual storage devices 342-348. In particular, in one illustrative embodiment, the virtual storage device configuration determination engine 326 determines whether the addition/removal of the physical storage device results in a virtual storage device 342-348 that is comprised entirely of non-rotating disk devices (e.g., SSD devices), such as in virtual storage device 348, a virtual storage device comprised entirely of rotating disk devices, such as virtual storage device 342, or a hybrid of rotating and non-rotating disk storage devices, such as virtual storage device 346.

In the depicted example, virtual storage device 344 is initially comprised of only SSD devices but then a rotating disk storage device is added to the virtual storage device 344 to thereby generate the updated virtual storage device 346 which is a hybrid of SSD devices and a HDD device. The addition of the rotating disk based physical storage device may reduce the I/O performance of the virtual storage device 346 from the view of virtual clients 330-334 which are expecting the virtual storage device 346 to be comprised of only SSD devices, such as in virtual storage device 344. Thus, the addition of a rotating disk based physical storage device to virtual storage device 344 to generate modified virtual storage device 346 is an event that should be notified to the virtual clients 330-334 that perform I/O operations on virtual storage device 346.

The notification engine 324 may send such notifications to the virtual clients 330-334. For example, when the monitoring agent 320 of the VIOS 310 is notified of the change in the physical storage devices of the virtual storage device 344 to generate virtual storage device 346, the notification engine 324 of the monitoring agent 320 may report a check condition to the virtual clients 330-334 to inform the virtual clients 330-334 that the virtual storage device 344 state has changed. The virtual clients 330-334 can then use the SCSI protocol to query the VPD page 0xB1 and determine the changes to the physical storage devices making up the changed virtual storage device 346.

As a result of these notifications, the virtual clients 330-334 may modify the processes accessing the virtual storage device 346, cause the virtual clients 330-334 to migrate data to another virtual storage device 342-348, or the like. As mentioned above, such actions may be performed, for example, so as to move workloads of the virtual clients 330-334 to virtual devices that can provide faster I/O access than those that have been modified as identified in such notifications.

It should be noted that while the illustrative embodiments above are described in terms of a callback framework, the illustrative embodiments are not limited to such. Rather, any mechanism for notifying a monitoring agent 320 of the occurrence of an event that may result in a change in the types of physical storage devices comprising virtual storage devices 342-348 of a storage system 340, may be used without departing from the spirit and scope of the illustrative embodiments. For example, in one illustrative embodiment, rather than using a callback framework, the monitoring agent 320 may utilize a daemon process to periodically check the characteristics of the underlying physical storage devices of the virtual storage devices 342-348. If the virtual storage device 342-348 state has changed, then the monitoring agent 320 may be used to notify registered entities, e.g., virtual clients 330-334.

Again, it should be appreciated that while the illustrative embodiments above are described in terms of the monitoring agent 320 being part of the VIOS 310, the illustrative embodiments are not limited to such. Rather, the monitoring agent 320 may be part of a separate virtualization intermediary, such as a hypervisor or the like, may be a separate device with which the VIOS 310 communicates, may be part of a host system, such as a server system, or a storage system, or the like. The above illustrative embodiments are intended to be illustrative and not limiting with regard to the particular configurations of the elements performing the operations set forth in this description.

Figure 4:
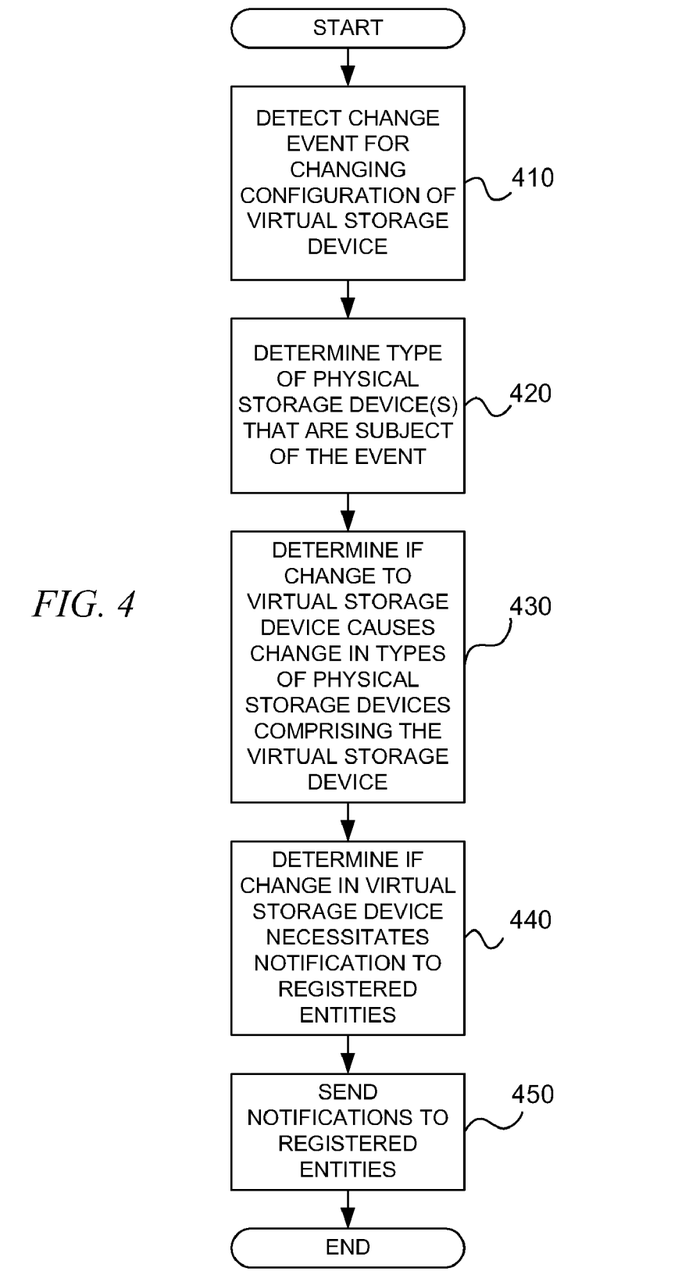
FIG. 4 is an example flowchart outlining an example operation for monitoring for changes to a physical configuration of storage devices associated with a virtual storage device in accordance with one illustrative embodiment.

FIG. 4 is an example flowchart outlining an example operation for monitoring for changes to a physical configuration of storage devices associated with a virtual storage device in accordance with one illustrative embodiment. The operation outlined in FIG. 4 may be performed, for example, by the monitoring agent 320 in FIG. 3 in one illustrative embodiment. The operation assumes that the storage system and monitoring agent are already present, the virtual storage device is already created and in existence, and at least one recipient has been registered through a standard registration process to receive notifications. The operation is for detecting dynamic changes to the virtual storage device and determining whether such changes warrant a notification to registered recipients.

As shown in FIG. 4, the operation starts with detecting a change event for changing the configuration of a virtual storage device (step 410). As discussed at length above, such a change event may be the addition of a new physical storage device to the storage system and the virtual storage device, the migration of data from one set of physical storage devices to another set of physical storage devices, the initialization of the virtual storage device, or the like. The detection of the change may be performed through a callback mechanism, daemon process, or the like. For example, a VIOS command to add a new physical storage device may trigger the event which causes the callback mechanism or daemon process to send a message to the monitoring agent indicating the occurrence of the event.

In response to detecting the change event, the monitoring agent determines the types of physical storage device(s) that are the subject of the event (step 420). For example, the monitoring agent may determine the types of physical storage devices being added or removed from virtual storage device. As mentioned above, investigating the VPD information for the physical storage devices, utilizing a SCSI command to determine the rotational speed of the physical storage devices, or any other mechanism for identifying the types of physical storage devices may be used to identify the types of the physical storage devices that are the subject of the change event. In one illustrative embodiment, this step results in a determination as to whether the physical storage devices that are the subject of the change event are non-rotating media based physical storage devices (e.g., SSD devices) or rotating media based physical storage devices (e.g., HDD devices). For example, based on the rotating speed of the physical storage device, if the rotating speed value is anything but a 1, then the physical storage device is determined to be a rotating media based physical storage device. If the value of the rotating speed is 1, then it can be assumed that the physical storage device is of the non-rotating media based type.

Based on the type of the physical storage devices that are the subject of the change event, and the types of physical storage devices that are already present in the virtual storage device, as has been previously determined through a prior iteration of this operation, a determination is made as to if the change to the virtual storage device causes a change in the types of physical storage devices comprising the virtual storage device (step 430). That is, if the virtual storage device was previously comprised only of non-rotating media type physical storage devices, and a new rotating media type physical storage device is being added to the virtual storage device, then this constitutes a change in the configuration of the virtual storage device with regard to the types of physical storage devices that are part of the virtual storage device. If another non-rotating media based physical storage device is being added instead, however, then this would not result in a change in the configuration of the virtual storage device with regard to the types of physical storage devices that are part of the virtual storage device. Similarly, if the virtual storage device were previously a hybrid of multiple types of physical storage devices, e.g., both rotating and non-rotating types of physical storage devices, if the removal of a physical storage device results in the remaining physical storage devices all being of the same type, then this may be a change in configuration of the virtual storage device with regard to the types of the physical storage devices that are part of the virtual storage device.

A determination is then made as to whether the change in virtual storage device configuration necessitates notification to registered recipients or entities (step 440). That is, not all changes necessarily will result in a notification needing to be sent. For example, if a virtual storage device is originally comprised of a hybrid of rotating and non-rotating media based physical storage devices, and all of the non-rotating media based physical storage devices are removed from the virtual storage device, all that is left is the rotating media based physical storage devices. Since, in the hybrid case, the virtual storage device is still reported as a rotating media based virtual storage device to registered recipients, the change event does not cause any change requiring notification, i.e. the virtual storage device would still be indicated to registered recipients as a rotating media based virtual storage device because all that remains is rotating media based physical storage devices.

Based on the determination of whether to send a notification or not, notifications are sent to registered recipients or entities where appropriate (step 450). The notification may indicate a change in the type of the virtual storage device, for example. In one illustrative embodiment, if the virtual storage device is comprised entirely of rotating media based storage devices, or is a hybrid of rotating media and non-rotating media based storage devices, the virtual storage device may be indicated as being a rotating media based storage device since the rotating media based physical storage devices represent the limiting factor in I/O access rates. If the virtual storage device is comprised entirely of non-rotating media based storage devices, then the virtual storage device may be indicated as being a non-rotating media based storage device.

Although not shown in FIG. 4, it should be appreciated that the registered recipients or entities, which may be devices, processes, applications, or the like, may perform appropriate actions to adjust their operation based on the dynamic changes to the virtual storage devices with which they interact. For example, the registered recipients or entities may adjust workloads to take into account the increased or decreased I/O performance corresponding to the change in virtual storage device configuration. Any appropriate action may be performed by such registered recipients or entities based on the notifications transmitted by the mechanisms of the illustrative embodiments.

Thus, the mechanisms of the illustrative embodiments detect dynamic changes to virtual storage devices and determine whether such changes warrant notifications to registered recipients. In one illustrative embodiment, these mechanisms monitor the virtual storage devices of a storage system to determine if changes in the physical storage devices making up the virtual storage devices result in a uniform set of rotating media based storage devices or non-rotating media based storage devices, or if the change results in a hybrid of rotating and non-rotating media based storage devices. Based on this monitoring, notifications are sent to registered recipients if the change on configuration of the virtual storage device is indicative of a change in the I/O performance of the virtual storage device. Thus, for example, the mechanisms of the illustrative embodiments may notify registered recipients, such as virtual clients, when a virtual storage device that was previously comprised of only SSD devices, is updated to include HDD devices, when a virtual storage device comprised of a hybrid of SSD devices and HDD devices is updated to remove the HDD devices and thus, only SSD devices are remaining, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for detecting changes in virtual storage device configurations, comprising:
   detecting, by a monitoring agent in the data processing system, an event corresponding to a change in configuration of a virtual storage device, wherein the virtual storage device is comprised of a plurality of portions of a plurality of physical storage devices;
   in response to detecting the event, determining, by the monitoring agent in the data processing system, if the change in configuration of the virtual storage device results in a change in the types of physical storage devices that are part of the virtual storage device; and
   in response to a determination that the change in configuration of the virtual storage device results in a change in the types of physical storage devices that are part of the virtual storage device, transmitting, by the monitoring agent in the data processing system, a notification of the results of the change in configuration of the virtual storage device to one or more recipient devices or applications.

2. The method of claim 1, wherein determining if the change in configuration of the virtual storage device results in a change in the types of physical storage devices that are part of the virtual storage comprises determining whether the plurality of physical storage devices comprising the virtual storage device after the event is one of a hybrid of types of physical storage devices, a uniform type of physical storage devices of a first input/output (I/O) access speed, or a uniform type of physical storage devices of a second I/O access speed that is faster than the first I/O access speed.

3. The method of claim 2, wherein if the plurality of physical storage devices comprises either a hybrid of types of physical storage devices or a uniform type of physical storage devices of the first I/O access speed, the data processing system reports the virtual storage device to be a virtual storage device having the first I/O access speed to virtual clients.

4. The method of claim 3, wherein the type of physical storage devices of the first I/O access speed are hard disk drives, and wherein the type of physical storage devices of the second I/O access speed are solid state disk drives.

5. The method of claim 1, wherein the types of physical storage devices comprise a first type in which a physical storage device uses rotating disk media upon which data is stored, and a second type in which a physical storage device uses non-rotating media upon which data is stored.

6. The method of claim 5, wherein the second type of physical storage device is a solid state drive (SSD) device, and wherein the first type of physical storage device is any type of hard disk drive (HDD).

7. The method of claim 1, wherein the event is at least one of an addition of a physical storage device to the virtual storage device or a removal of a physical storage device from the virtual storage device.

8. The method of claim 1, wherein the data processing system is a virtual input/output server, and wherein the virtual storage device is a virtual block storage device.

9. The method of claim 1, wherein determining if the change in configuration of the virtual storage device results in a change in the types of physical storage devices that are part of the virtual storage device comprises:
   using a small computer system interface (SCSI) query command to access a vital product data (VPD) memory page that identifies vital product data of one or more physical storage devices of the virtual storage device.

10. The method of claim 1, wherein transmitting a notification of the results of the change in configuration of the virtual storage device to one or more registered recipients registered to receive such notifications comprises using a callback framework to send the notification to one or more registered recipient devices or applications registered to receive such notifications.

11. The method of claim 1, wherein determining if the change in configuration of the virtual storage device results in a change in the types of physical storage devices that are part of the virtual storage device comprises:
   determining if the change in configuration of the virtual storage device causes a change in input/output access speed of the virtual storage device from a previous I/O access speed of the virtual storage device; and
   determining that there is a change in the types of physical storage devices that are part of the virtual storage device in response to a determination that the I/O access speed of the virtual storage device has changed from the previous I/O access speed of the virtual storage device.

12. A computer program product comprising a non-transitory computer readable storage medium having a computer readable program stored therein, wherein the computer readable program, when executed on a computing device, causes the computing device to:

detect an event corresponding to a change in configuration of a virtual storage device, wherein the virtual storage device is comprised of a plurality of portions of a plurality of physical storage devices;

determine, in response to detecting the event, if the change in configuration of the virtual storage device results in a change in the types of physical storage devices that are part of the virtual storage device; and     transmit, in response to a determination that the change in configuration of the virtual storage device results in a change in the types of physical storage devices that are part of the virtual storage device, a notification of the results of the change in configuration of the virtual storage device to one or more recipient devices or applications.

13. The computer program product of claim 12, wherein the computer readable program causes the computing device to determine if the change in configuration of the virtual storage device results in a change in the types of physical storage devices that are part of the virtual storage by determining whether the plurality of physical storage devices comprising the virtual storage device after the event is one of a hybrid of types of physical storage devices, a uniform type of physical storage devices of a first input/output (I/O) access speed, or a uniform type of physical storage devices of a second I/O access speed that is faster than the first I/O access speed.

14. The computer program product of claim 13, wherein if the plurality of physical storage devices comprises either a hybrid of types of physical storage devices or a uniform type of physical storage devices of the first I/O access speed, the data processing system reports the virtual storage device to be a virtual storage device having the first I/O access speed to virtual clients.

15. The computer program product of claim 14, wherein the type of physical storage devices of the first I/O access speed are hard disk drives, and wherein the type of physical storage devices of the second I/O access speed are solid state disk drives.

16. The computer program product of claim 12, wherein the types of physical storage devices comprise a first type in which a physical storage device uses rotating disk media upon which data is stored, and a second type in which a physical storage device uses non-rotating media upon which data is stored.

17. The computer program product of claim 16, wherein the second type of physical storage device is a solid state drive (SSD) device, and wherein the first type of physical storage device is any type of hard disk drive (HDD).

18. The computer program product of claim 12, wherein the event is at least one of an addition of a physical storage device to the virtual storage device or a removal of a physical storage device from the virtual storage device.

19. The computer program product of claim 12, wherein the computer readable program causes the computing device to determine if the change in configuration of the virtual storage device results in a change in the types of physical storage devices that are part of the virtual storage device by: using a small computer system interface (SCSI) query command to access a vital product data (VPD) memory page that identifies vital product data of one or more physical storage devices of the virtual storage device.

20. The computer program product of claim 12, wherein the computer readable program causes the computing device to transmit a notification of the results of the change in configuration of the virtual storage device to one or more registered recipients registered to receive such notifications by using a callback framework to send the notification to one or more registered recipient devices or applications registered to receive such notifications.

21. The computer program product of claim 12, wherein determining if the change in configuration of the virtual storage device results in a change in the types of physical storage devices that are part of the virtual storage device comprises:

determining if the change in configuration of the virtual storage device causes a change in input/output access speed of the virtual storage device from a previous I/O access speed of the virtual storage device; and     determining that there is a change in the types of physical storage devices that are part of the virtual storage device in response to a determination that the I/O access speed of the virtual storage device has changed from the previous I/O access speed of the virtual storage device.

22. An apparatus, comprising:

a processor; and a memory coupled to the processor, wherein the memory comprises instructions which, when executed by the processor, cause the processor to:

detect an event corresponding to a change in configuration of a virtual storage device, wherein the virtual storage device is comprised of a plurality of portions of a plurality of physical storage devices;

determine, in response to detecting the event, if the change in configuration of the virtual storage device results in a change in the types of physical storage devices that are part of the virtual storage device; and transmit, in response to a determination that the change in configuration of the virtual storage device results in a change in the types of physical storage devices that are part of the virtual storage device, a notification of the results of the change in configuration of the virtual storage device to one or more recipient devices or applications.

23. The apparatus of claim 22, wherein determining if the change in configuration of the virtual storage device results in a change in the types of physical storage devices that are part of the virtual storage device comprises:

determining if the change in configuration of the virtual storage device causes a change in input/output access speed of the virtual storage device from a previous I/O access speed of the virtual storage device; and     determining that there is a change in the types of physical storage devices that are part of the virtual storage device in response to a determination that the I/O access speed of the virtual storage device has changed from the previous I/O access speed of the virtual storage device.

\* \* \* \* \*